UNITED STATES PATENT OFFICE.

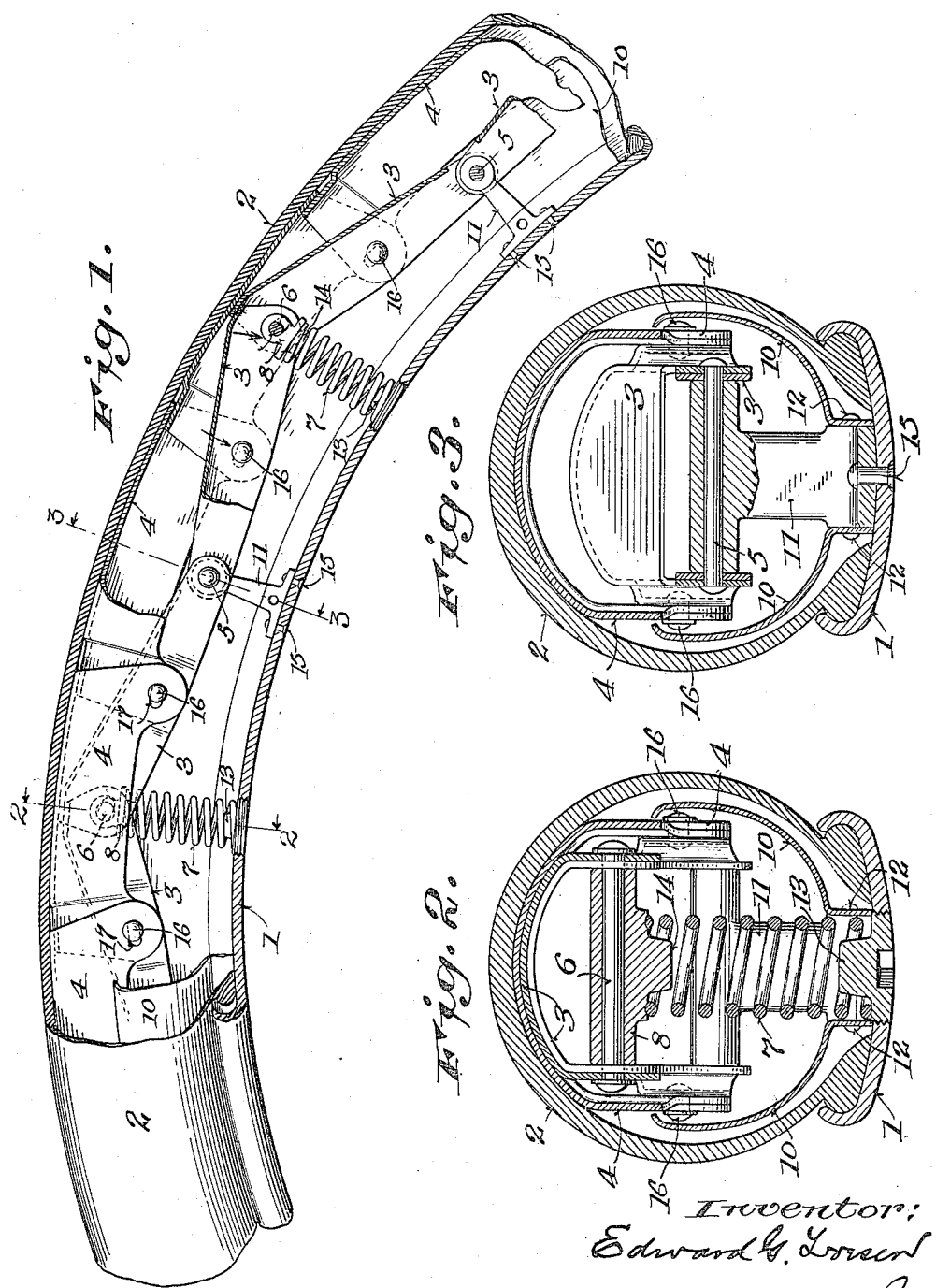
E. G. LOESER.
METALLIC SPRING ACTUATED MECHANISM FOR RUBBER TIRES.
APPLICATION FILED JAN. 13, 1916.
1,224,758. Patented May 1, 1917.

EDWARD G. LOESER, OF ROXBURY TOWNSHIP, DANE COUNTY, WISCONSIN, ASSIGNOR TO CANTILEVER AIRLESS TIRE CO., OF MILWAUKEE, WISCONSIN, A CORPORATION OF WISCONSIN.

METALLIC SPRING-ACTUATED MECHANISM FOR RUBBER TIRES.

1,224,758.     Specification of Letters Patent.     Patented May 1, 1917.

Application filed January 13, 1916. Serial No. 71,855.

*To all whom it may concern:*

Be it known that I, EDWARD G. LOESER, a citizen of the United States, residing in the township of Roxbury, county of Dane, and State of Wisconsin, have invented new and useful Improvements in Metallic Spring-Actuated Mechanism for Rubber Tires, of which the following is a specification.

My invention relates to improvements in vehicle tires.

The object of my invention is to provide a simple and practical substitute for the ordinary pneumatic tire, whereby an outer flexible casing may be supported mechanically and resiliently without utilizing air or other fluid under pressure. More particularly, the object of my invention is to provide an annular lever structure adapted to resiliently support a series of arches upon which an outer covering of flexible material may be mounted yieldingly and supported from the wheel rim by the levers.

In the drawings:—

Figure 1 is a side view of a fragment of a wheel rim and tire embodying my invention, the same being illustrated partly in longitudinal section.

Fig. 2 is a transverse sectional view drawn on line 2—2 of Fig. 1.

Fig. 3 is a transverse sectional view drawn on line 3—3 of Fig. 1.

Like parts are identified by the same reference characters throughout the several views.

The wheel rim 1 may be of any ordinary construction with side flanges to engage the margins of the casing 2, which also may be of ordinary construction and which may be composed of any suitable flexible material. The rim 1 is provided with a set of radially projecting brackets 11 to which levers 3 are pivotally connected by cross pins or bolts 5. The levers 3 are arranged in pairs with meeting ends pivoted to the cross pins 5 and preferably having side flanges which lap upon each other, as shown. At their opposite ends the levers 3 of each pair meet and preferably interlap with levers 3 of adjacent pairs, these meeting ends being pivotally connected by cross pins or bolts 6, which pass through slots in the side flanges in the levers, to loosely hinge these ends of the levers together. A spacer 8 is employed for each pin or bolt 6. These spacers are each provided with a longitudinal aperture through which one of the bolts 6 passes, and each spacer is also provided with an inwardly projecting lug 14 adapted to enter the outer end of a helically coiled spring 7 which is interposed between the spacer 8 and the rim 1. The rim 1 is preferably provided with a lug 13 which enters the inner end of the spring, and these lugs 13 and 14 are therefore adapted to anchor the springs in position. The springs 7 are adapted to support the spacer 8 in a radially projected position, whereby the ends of the levers connected by the pivot pins or bolts 6 are pushed or swung outwardly toward the tread portion of the casing 2.

The tread portion of the casing 2 is lined interiorly by a set of arched segmental members 4. The outer portion of each member 4 is curved transversely in substantial conformity to the curve of the casing 2 and is provided with side flanges extending inwardly toward the rim. These members 4 are also arranged to interlap at their meeting ends, and their side flanges are connected with each other by pivot pins or bolts 16 which pass through elongated apertures or slots in these members, and loosely hinge them together. The tread portion of each member 4, *i. e.* that portion which bears against the tread portion of the casing 2, is offset inwardly at one end sufficiently to pass inside of the next succeeding member 4, thus forming a loose telescoping connection. The pins 16 may also serve to connect the members 4 with levers 3 at points substantially mid-way between the lever fulcrum pins 5 and the spring supported pins 6. Owing to the fact that the apertures 17, through which pins 16 pass, are elongated in members 4 it is obvious that the spring supported ends of the levers may move inwardly without binding, the apertures through which pins 6 pass being similarly elongated.

Brackets 11 may be connected with the rim 1 by ordinary bolts or rivets 15. The rim is also provided with a set of curved guards 10 secured to the brackets 11 near their inner margins and projecting outwardly in general conformity to the curvature of the casing. The outer margins of these guards are in turn in the close proximity to the side flanges of the arched tread supporting elements 4. The guards 10 are annular in form completely encircling the rim, and their function is to prevent the sides of the casing from collapsing inwardly when the tread surface is pushed inwardly at any point in opposition to the tension of the springs 7.

With the above described construction it is obvious that the outer or tread portion of the casing 2 will be resiliently supported by the levers 3 and springs 7. The interposed segmental arches 4 relieve the casing from friction and enable the lever movements to take place without wearing or cutting the casing at any point. The side guards 10 by preventing the casing from collapsing inwardly protect it from being pinched in engagement with the levers, springs or arches, and also add to the durability of the casing by permitting outward flexion only from the normal position.

I claim:—

1. In a device of the described class, the combination with a wheel rim and a flexible casing, of an annular series of segmental arched members, pivotally connected together at their ends and adapted to support the tread portion of the casing, an annular series of loosely connected levers, pivoted to the wheel rim, and springs interposed between the meeting ends of the levers and rim, and arranged to push the levers into supporting relation to said segmental arched members.

2. The combination with a wheel rim and a flexible casing mounted thereon, of a set of interlapping segmental arches supporting the tread portion of the casing and an annular series of loosely connected levers, each having one end pivotally connected with the rim and the other end resiliently supported therefrom and each lever being also adapted to coöperate with all of the others in supporting said arches.

3. The combination with a wheel rim and a flexible casing mounted thereon, of an annular series of segmental arches supporting the tread portion of the casing, an annular series of levers pivotally fulcrumed to the rim and having sliding link connection with each other, springs interposed between said levers and the rim, and adapted to press the levers outwardly in the direction of the arches, and supporting connections between the arches and said levers.

4. The combination with a wheel rim and a flexible casing mounted thereon, of an annular series of segmental arches supporting the tread portion of the casing, an annular series of levers pivotally fulcrumed to the rim and having sliding link connection with each other, springs interposed between said levers and the rim, and adapted to press the levers outwardly in the direction of the arches, and supporting connections between the arches and said levers, together with a set of guards interposed between the casing sides and said levers and springs, said guards being connected with the rim and being curved in substantial conformity to the curvature of the sides of the casing.

5. The combination with a wheel rim and a flexible casing mounted thereon, of a set of segmental arches in loose hinged joint connection with each other arranged in an annular series in supporting relation to the tread portion of the casing, said arches having inwardly projecting side flanges, a set of arch supporting levers in pivotal fulcrum connection with the rim and projecting outwardly between the side flanges of the arches, the ends of said levers distant from their fulcrums being loosely connected with each other, each alternate lever projecting in an opposite direction from its fulcrum to that in which the intermediate lever projects, springs supporting the loosely connected ends of said levers from the rim, and supporting connections between said levers and the arches, adapted to permit the arches and the levers to move inwardly against the tension of the springs when the casing is subjected to pressure.

6. The combination with a wheel rim and a flexible casing mounted thereon, of a set of segmental arches in loose hinged joint connection with each other, arranged in an annular series in supporting relation to the tread portion of the casing, said arches having inwardly projecting side flanges, a set of arch supporting levers in pivotal fulcrum connection with the rim and projecting outwardly between the side flanges of the arches, the ends of said levers distant from their fulcrums being loosely connected with each other, each alternate lever projecting in an opposite direction from its fulcrum to that in which the intermediate lever projects, springs supporting the loosely connected ends of said levers from the rim, and supporting connections between said levers and the arches, adapted to permit the arches and the levers to move inwardly against the tension of the springs when the casing is subjected to pressure, each of the levers being adapted to directly support the meeting end portions of two arches.

7. The combination with a wheel rim and a flexible casing mounted thereon, of a set of segmental members supporting the tread portion of the casing, said members forming an annular series, each in interlapping relation to the next adjacent members of the series, an annular series of levers each pivoted to the rim at one end and loosely connected with another lever at its opposite end substantially midway between the ends of one of the segmental members, means for supporting the meeting ends of the segmental members from intermediate portions of said levers, and means for resiliently supporting said meeting ends of the levers.

In testimony whereof I affix my signature in the presence of two witnesses.

EDWARD G. LOESER.

Witnesses:
JAS. B. ERWIN,
I. D. BREMER.